United States Patent [19]

Okamoto et al.

[11] Patent Number: 4,813,121
[45] Date of Patent: Mar. 21, 1989

[54] METHOD OF MOUNTING A COVER FOR AN OVER-RUNNING CLUTCH

[75] Inventors: Kyoichi Okamoto; Shigeru Shiroyama, both of Himeji, Japan

[73] Assignee: Mitsubishi Denki Kabushiki Kaisha, Tokyo, Japan

[21] Appl. No.: 24,755

[22] Filed: Mar. 11, 1987

[30] Foreign Application Priority Data

Apr. 7, 1986 [JP] Japan .................................. 61-81468

[51] Int. Cl.$^4$ ............................................. B21D 39/04
[52] U.S. Cl. ........................................ 29/509; 29/511;
  29/520; 384/584; 384/903
[58] Field of Search ................... 29/49.5 S, 469.5, 509,
  29/511, 520; 192/45; 277/9; 384/584, 903;
  403/274, 279, 282, 365

[56] References Cited

U.S. PATENT DOCUMENTS

| | | | |
|---|---|---|---|
| 1,249,948 | 12/1917 | Gruber | 29/520 X |
| 1,498,360 | 6/1924 | Douglas | 29/520 |
| 2,211,053 | 8/1940 | Critchfield | 192/45 |
| 3,174,598 | 3/1965 | Mattson | 192/45 |
| 3,232,650 | 2/1966 | Ross et al. | 403/274 X |
| 3,460,655 | 8/1969 | Bowcott | 192/45 |
| 4,510,406 | 4/1985 | Morishita et al. | 310/99 |

FOREIGN PATENT DOCUMENTS

| | | | |
|---|---|---|---|
| 861783 | 9/1981 | U.S.S.R. | 192/45 |
| 561134 | 5/1944 | United Kingdom | 403/282 |
| 2117836 | 10/1983 | United Kingdom | |

Primary Examiner—Carl E. Hall
Assistant Examiner—Andrew E. Rawlins
Attorney, Agent, or Firm—Armstrong, Nikaido, Marmelstein & Kubovcik

[57] ABSTRACT

In an over-running clutch including a cylindrical clutch outer, a clutch inner located inside an inner periphery of the clutch outer and defining a wedge-shaped space between the same and the inner periphery of the clutch outer, an engagement member mounted in the wedge-shaped space, an elastic member of urging the engagement member in a convergent direction of the wedge-shaped space, a washer for closing the wedge-shaped space, and a cover fitted on an outer periphery of the clutch outer for fixing the washer; a method of mounting the cover comprising the steps of bending a front end portion of the cover inwardly at an acute angle, insertingly engaging the cover with the outer periphery of the clutch outer, bending back the front end portion at right angles and bending the rear end portion of the cover to fix the cover to the clutch outer.

3 Claims, 1 Drawing Sheet

METHOD OF MOUNTING A COVER FOR AN OVER-RUNNING CLUTCH

BACKGROUND OF THE INVENTION

The present invention relates to a method of mounting a cover for sealing a wedge-shaped space of known construction defined between a clutch outer and a clutch inner of an over-running clutch.

FIGS. 3a and 3b show a conventional method of mounting such a cover. Referring to FIGS. 3a and 3b, a clutch outer 1 is formed at its inner periphery of a rear portion with a helical spline engaging with an output shaft, and is formed at its inner periphery of a front portion with a cam. A clutch inner 2 is provided to define a wedge-shaped space between an outer periphery of the rear portion thereof and the cam of the clutch outer 1. The clutch inner 2 is formed at its front portion with a pinion 3 having a substantially larger diameter than the clutch inner 2. The pinion 3 meshes with a ring gear (not shown) of an engine and transmitting a rotational force. A sleeve bearing 4 is engaged with an inner periphery of the clutch inner 2, and the output shaft is loosely engaged with the sleeve bearing 4. An engagement member (roller) 5 is provided in the wedge-shaped space. The engagement member 5 is urged by an elastic member (not shown) in a convergent direction of the wedge-shaped space, carrying out one-way transmission of the rotational force from the clutch outer 1 to the clutch inner 2. A stop washer 6 is loosely engaged with a groove formed at an intermediate portion of the clutch inner 2, functioning to prevent projection of the clutch inner 2. A cover 7 is provided to fix the stop washer 6, and is fixed to an outer periphery of the clutch outer 1.

There will be now described a conventional method of mounting the cover of the over-running clutch. The clutch outer 1 is installed to the clutch inner 2, and the roller 5 and the elastic member for urging the same are mounted in the wedge-shaped space. The washer 6 is abutted against a side surface of the clutch outer 1 and the roller 5, and is engaged with the groove of the clutch inner 2. Then, the cover 7 of a cylindrical structure with its front end portion 7a bent inwardly at a right angle is inserted from the pinion 3 side (See FIG. 3a), and then a rear end portion 7b of the cover 7 is fixed by bending to the outer periphery of the clutch outer 1.

However, in the conventional cover mounting method, an inner diameter of the cover must be greater than an outer diameter of the pinion, so as to insert the cover from the pinion side. Accordingly, the forward bent part of the cover is reduced in size to such an extent that it becomes difficult to retain grease internally of the wedge-shaped space. Furthermore, it is difficult to commonly use the cover irrespective of a change in outer diameter of the pinion.

SUMMARY OF THE INVENTION

Accordingly, it is an object of the present invention to provide a method of mounting a cover of an over-running clutch which will provide a sufficiently large bent part of the cover and improve retention of the grease irrespective of a large outer diameter of the pinion.

It is another object of the present invention to provide a method of mounting a cover of an over-running clutch which permits the cover to be commonly used irrespective of a change in outer diameter of the pinion.

According to the present invention, in an over-running clutch of the type including a cylindrical clutch outer, a clutch inner located inside an inner periphery of the clutch outer and defining a wedge-shaped space between the same and the inner periphery of the clutch outer, an engagement member mounted in the wedge-shaped space, an elastic member for urging the engagement member in a convergent direction of the wedge-shaped space, a washer for closing the wedge-shaped space, and a cover fitted on an outer periphery of the clutch outer for fixing the washer; a method of mounting the cover is provided which comprises the steps of bending a front end portion of the cover inwardly at an acute angle, insertingly engaging the cover with the outer periphery of the clutch outer, and bending back the front end portion of an right angle to fix the cover to the clutch outer.

In operation, since the cover is bent at its front end portion inwardly at acute angles before mounting, it is easily inserted from the pinion of the clutch inner. Furthermore, since the front end portion of the cover as bent is bent back at right angles after mounting, the other end of the cover may be secured.

Other objects and features of the invention will be more fully understood from the following detailed description and appended claims when taken with the accompaning drawings.

DETAILED DESCRIPTION OF THE PREFERRED EMBODIMENT

Figure 1A:
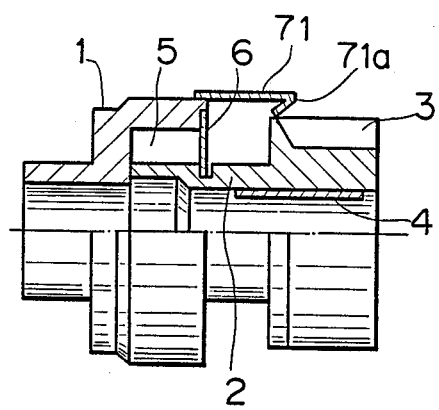
FIGS. 1a and 1b are sectional views showing the cover mounting method of the over-running clutch of a preferred embodiment according to the present invention.
Figure 1B:
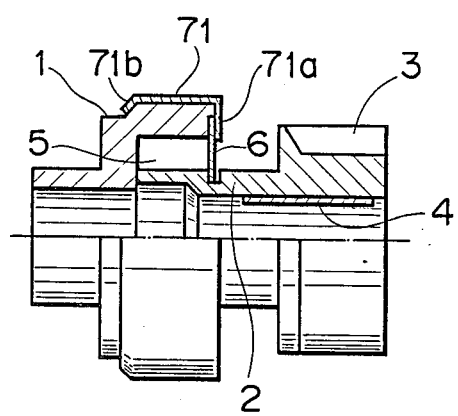
Figure 3A:
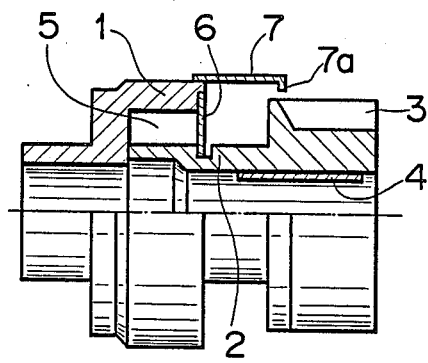
FIGS. 3a and 3b are sectional views showing the conventional cover mounting method for a over-running clutch.
Figure 3B:
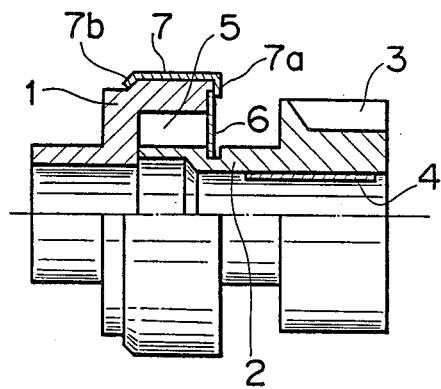

FIGS. 1a and 1b show a cover mounting method of the over-running clutch according to the present invention. In the drawings, the same reference numerals as used in FIGS. 3a and 3b denote the same or corresponding parts in FIGS. 1a and 1b. A cylindrical cover 71 is formed with a front end portion 71a bent to extend inwardly and rearwardly at an acute angle and provide an internal diameter greater than the diameter of pinion 3. The cover 71 is inserted from the pinion 3 side of the clutch inner 1 (See FIG. 1a). Upon mounting of the cover 71 to the clutch cover 1, the front end portion 71a as bent acutely is bent back at right angles, and is fixed to the clutch outer 1. Then, a rear end portion 71b of the cover 71 is pressed or bent and fixed to the clutch outer 1 (See FIG. 1b). The constitution of the other parts is similar to that of the prior art device as previously mentioned, and therefore, explanation thereof will be omitted.

Figure 2A:
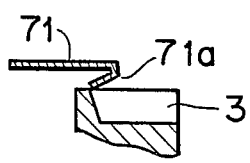
FIGS. 2a and 2b are sectional views of the essential part of modified embodiments according to the present invention.

FIG. 2a shows another embodiment of the front end portion 71a of the cover 71. The front end portion 71a is bent at two steps.

Figure 2B:
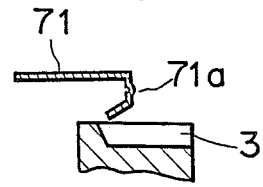

FIG. 2b shows a further modified embodiment of the front end portion 71a of the cover 71. The front end portion 71a is formed with indentation.

In the above modified embodiments, the cover 71 is fixed to the clutch outer 1 in the same manner as the embodiment of FIGS. 1a and 1b, but tight contact between the clutch outer 1 and the washer 6 may be improved upon fixing of the cover 71.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A method of mounting a cover to the outer periphery of a cylindrical clutch outer in an over-running clutch of the type including: a pinion having a clutch inner formed at one end thereof, said pinion having a substantially larger diameter than said clutch inner, said clutch inner being located inside an inner periphery of said clutch outer and defining a space between said clutch inner and the inner periphery of said clutch outer and a washer to seal said space, comprising the steps of: preparing a cover in the form of an annular member having a front end portion bent to extend rearwardly at an acute angle and having an internal diameter greater than the diameter of said pinion, sliding said cover rearwardly over the outer periphery of said clutch outer with the bent front end portion passing over the outer periphery of said pinion until said bent front end portion reaches a front end face of said clutch outer and is bent back to extend normally and radially inward on the front end face of said clutch outer to fix said washer in place, and bending a rear end portion of said cover radially inward on a rear face of said clutch outer to fixedly position said cover to said clutch outer.

2. The method as defined in claim 1, wherein said front end portion of said cover is bent at two steps before mounting.

3. The method as defined in claim 1, wherein said front end portion of said cover is formed with an indentation before mounting.